US012592824B2

(12) United States Patent
Singh et al.

(10) Patent No.: US 12,592,824 B2
(45) Date of Patent: Mar. 31, 2026

(54) SECURE APPARATUS TO SHARE AND DEPLOY MACHINE BUILD PROGRAMS UTILIZING UNIQUE HASH TOKENS

(71) Applicant: BANK OF AMERICA CORPORATION, Charlotte, NC (US)

(72) Inventors: Shailendra Singh, West Maharashtra (IN); Maneesh Sethia, Telangana (IN); Girish Kumar Kakanur, Mokila (IN); Abhijit Behera, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 327 days.

(21) Appl. No.: 18/207,332

(22) Filed: Jun. 8, 2023

(65) Prior Publication Data

US 2024/0413997 A1     Dec. 12, 2024

(51) Int. Cl.
*H04L 29/06*      (2006.01)
*H04L 9/00*      (2022.01)
*H04L 9/32*      (2006.01)

(52) U.S. Cl.
CPC .......... *H04L 9/3213* (2013.01); *H04L 9/3247* (2013.01); *H04L 9/3268* (2013.01); *H04L 9/50* (2022.05)

(58) Field of Classification Search
None
See application file for complete search history.

(56) References Cited

U.S. PATENT DOCUMENTS 7,334,723 B2    2/2008  Shepley et al.
7,533,802 B1    5/2009  Mcginley et al.
7,590,589 B2    9/2009  Hoffberg
7,721,951 B1    5/2010  Parsons et al.
(Continued)

OTHER PUBLICATIONS

LCX Team, "NFT and NFT Metadata, what's the difference?", Aug. 30, 2022, https://www.lcx.com/nft-and-nft-metadata-whats-the-difference/, p. 1-6. (accessed Jun. 19, 2025) (Year: 2022).*
(Continued)

*Primary Examiner* — Jeffery L Williams
(74) *Attorney, Agent, or Firm* — Moore & Van Allen PLLC; Nicholas C. Russell

(57) ABSTRACT

Systems, computer program products, and methods are described herein for secure apparatuses to share and deploy machine build programs utilizing unique hash tokens. The invention includes the steps of transforming a resource machine build-program into a first non-fungible token (NFT1) via a resource machine build orchestration module, embedding NFT1 into a flash drive using a flash drive preparation module, generating a second non-fungible token (NFT2) during an interaction of a resource machine with the USB flash drive via a dynamic NFT generator module, wherein NFT2 includes data representing an ownership certificate for the resource machine build owned by a vendor, generating a resultant integrated non-fungible token (NFT3) via a dynamic smart contract module, wherein NFT3 is generated by combining NFT1 and NFT2, and activating and deploying the resource machine build-program on the resource machine via a build activation module, wherein the activation is triggered by the generation of NFT3.

18 Claims, 7 Drawing Sheets

(56) References Cited

U.S. PATENT DOCUMENTS

| | | | |
|---|---|---|---|
| 7,805,377 B2 | 9/2010 | Felsher | |
| 8,100,323 B1 | 1/2012 | Crews et al. | |
| 8,316,237 B1 | 11/2012 | Felsher et al. | |
| 8,342,395 B1 | 1/2013 | Muschellack et al. | |
| 8,612,773 B2 | 12/2013 | Nataraj et al. | |
| 8,676,707 B2 | 3/2014 | Flitcroft et al. | |
| 8,903,943 B2 * | 12/2014 | Glaser | G06F 9/5027 |
| | | | 709/217 |
| 9,117,328 B2 | 8/2015 | Crews et al. | |
| 9,965,632 B2 | 5/2018 | Zarakas et al. | |
| 10,278,041 B2 | 4/2019 | Wesby | |
| 10,510,060 B2 | 12/2019 | Baar et al. | |
| 10,579,362 B1 * | 3/2020 | Maehler | G06F 8/65 |
| 10,630,501 B2 | 4/2020 | Ansari et al. | |
| 10,839,081 B2 | 11/2020 | Zarakas et al. | |
| 11,055,078 B2 * | 7/2021 | Hodder | G06F 9/526 |
| 11,100,205 B2 | 8/2021 | Burri et al. | |
| 11,265,230 B2 * | 3/2022 | Nielsen | H04L 41/5058 |
| 11,457,373 B2 | 9/2022 | Rucker et al. | |
| 11,580,009 B2 * | 2/2023 | Plawecki | G06N 5/04 |
| 11,657,384 B2 | 5/2023 | Wilson | |
| 11,809,376 B2 * | 11/2023 | He | G06F 16/173 |
| 11,842,186 B2 * | 12/2023 | Mugunda | G06F 8/654 |
| 12,051,307 B1 * | 7/2024 | Garg | H04L 9/3239 |
| 12,164,900 B2 * | 12/2024 | Griffin | G06N 20/00 |
| 12,277,201 B2 * | 4/2025 | Fox | H04L 67/02 |
| 12,314,706 B2 * | 5/2025 | Griffin | G06F 11/3428 |
| 2017/0344489 A1 * | 11/2017 | Kapoor | G06F 12/1009 |
| 2017/0346851 A1 | 11/2017 | Drake | |
| 2020/0104107 A1 * | 4/2020 | Hodder | G06F 8/71 |
| 2020/0134139 A1 * | 4/2020 | Vaish | G06F 16/1805 |
| 2021/0176240 A1 | 6/2021 | Rose | |
| 2023/0113377 A1 | 4/2023 | Yang | |
| 2024/0413997 A1 * | 12/2024 | Singh | H04L 9/3213 |

OTHER PUBLICATIONS

Metroclick.com, "Understanding NFT Metadata and its Importance in Management", May 30, 2023, https://www.metroclick.com/blockchain-solutions/nft-management/understanding-nft-metadata-and-its-importance-in-management/, p. 1-9. (accessed Jun. 19, 2025) (Year: 2023).*

Vojtech Rychnovsky, "What is NFT Metadata?", Jan. 3, 2023, Artiffine.com, https://www.artiffine.com/blog/what-can-i-make-into-an-nft, p. 1-12. (accessed Jun. 19, 2025) (Year: 2023).*

* cited by examiner

_204_

NFT

RELATIONSHIP LAYER      _252_

OWNERSHIP INFORMATION     _252A_

TOKEN LAYER      _254_

TOKEN IDENTIFICATION NO.     _254A_

METADATA LAYER      _256_

RESOURCE LOCATION     _256A_

RESOURCE DESCRIPTOR     _256B_

<descriptor 1>

<descriptor 2>

LICENSING LAYER      _258_

TRANSFERABILITY PARAMETERS     _258A_

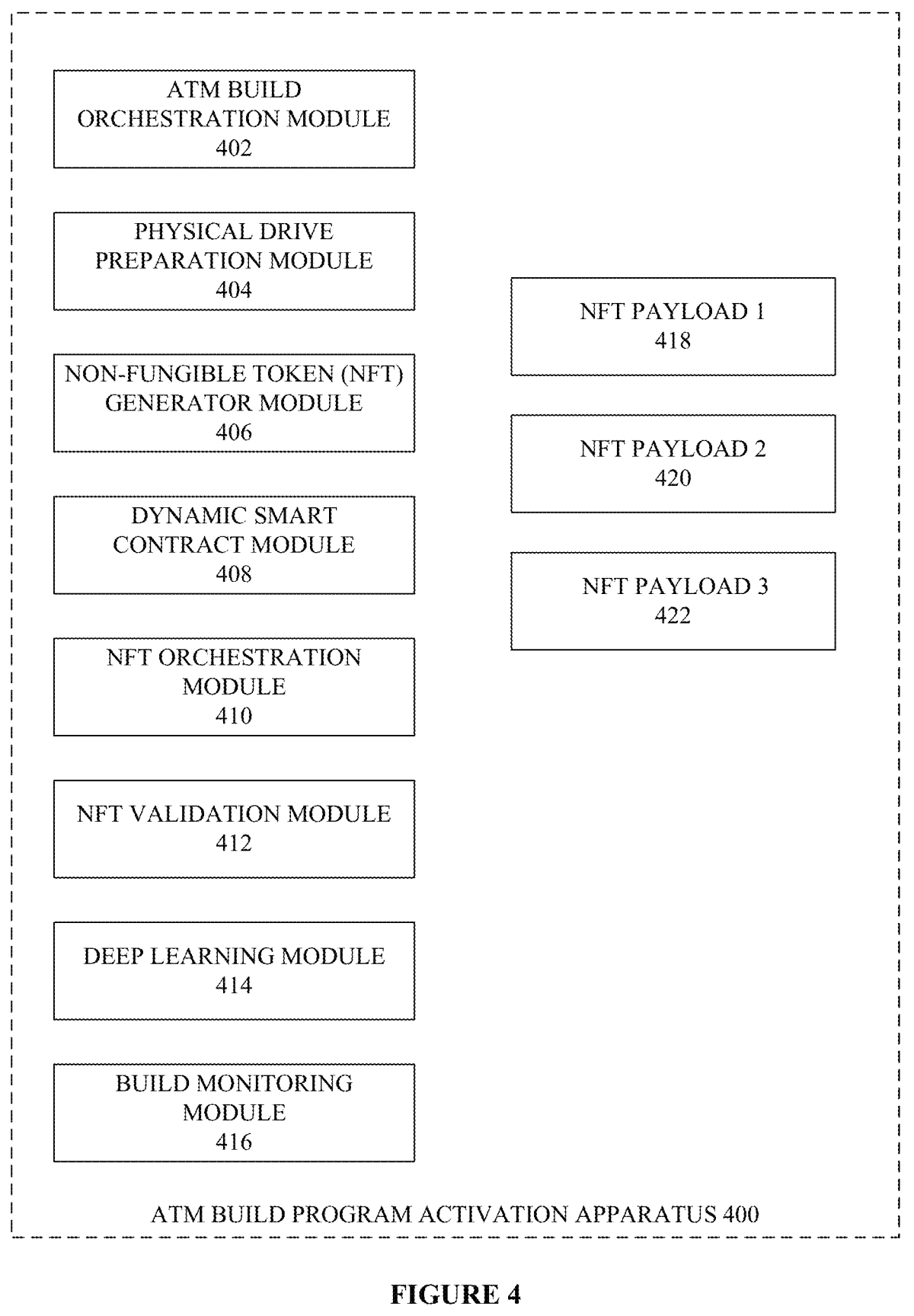

ATM BUILD
ORCHESTRATION MODULE
402

PHYSICAL DRIVE
PREPARATION MODULE
404

NON-FUNGIBLE TOKEN (NFT)
GENERATOR MODULE
406

DYNAMIC SMART
CONTRACT MODULE
408

NFT ORCHESTRATION
MODULE
410

NFT VALIDATION MODULE
412

DEEP LEARNING MODULE
414

BUILD MONITORING
MODULE
416

NFT PAYLOAD 1
418

NFT PAYLOAD 2
420

NFT PAYLOAD 3
422

ATM BUILD PROGRAM ACTIVATION APPARATUS 400

FIGURE 4

SECURE APPARATUS TO SHARE AND DEPLOY MACHINE BUILD PROGRAMS UTILIZING UNIQUE HASH TOKENS

TECHNOLOGICAL FIELD

Example embodiments of the present disclosure relate to a secure apparatus to share and deploy machine build programs utilizing unique hash tokens.

BACKGROUND

The current process of updating software for resource machines, which involves entities sending build packages to vendors via flash drives, poses significant chances for malfeasance, including the potential for alteration by malicious actors, necessitating the development of a zero-trust technical method to ensure secure deployment to the resource machines. Applicant has identified a number of deficiencies and problems associated with secure apparatuses to share and deploy machine build programs utilizing unique hash tokens Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for secure apparatuses to share and deploy machine build programs utilizing unique hash tokens. The present invention introduces an intelligent apparatus that facilitates and enforces a zero-trust technical method for secure resource machine build deployment. This secure technical procedure utilizes non-fungible tokens (NFTs) to deploy resource machine build programs on target resource machines via universal serial bus (USB) flash drives. To assure the secure deployment of the build program, a portion of the program is converted into a first NFT (NFT1) and stored within the USB flash drive. The vendor then uses this USB flash drive on the target resource machine to generate a second NFT (NFT2). These two NFTs combine to generate a third NFT (NFT3) that encompasses the fully deployable resource machine build program. A controlling smart contract manages NFT1, NFT2, and NFT3 and contains pre-defined rules for build deployment such as the number of times a build can be copied, specific resource machine numbers for which the build program will execute, build auto purging, etc.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
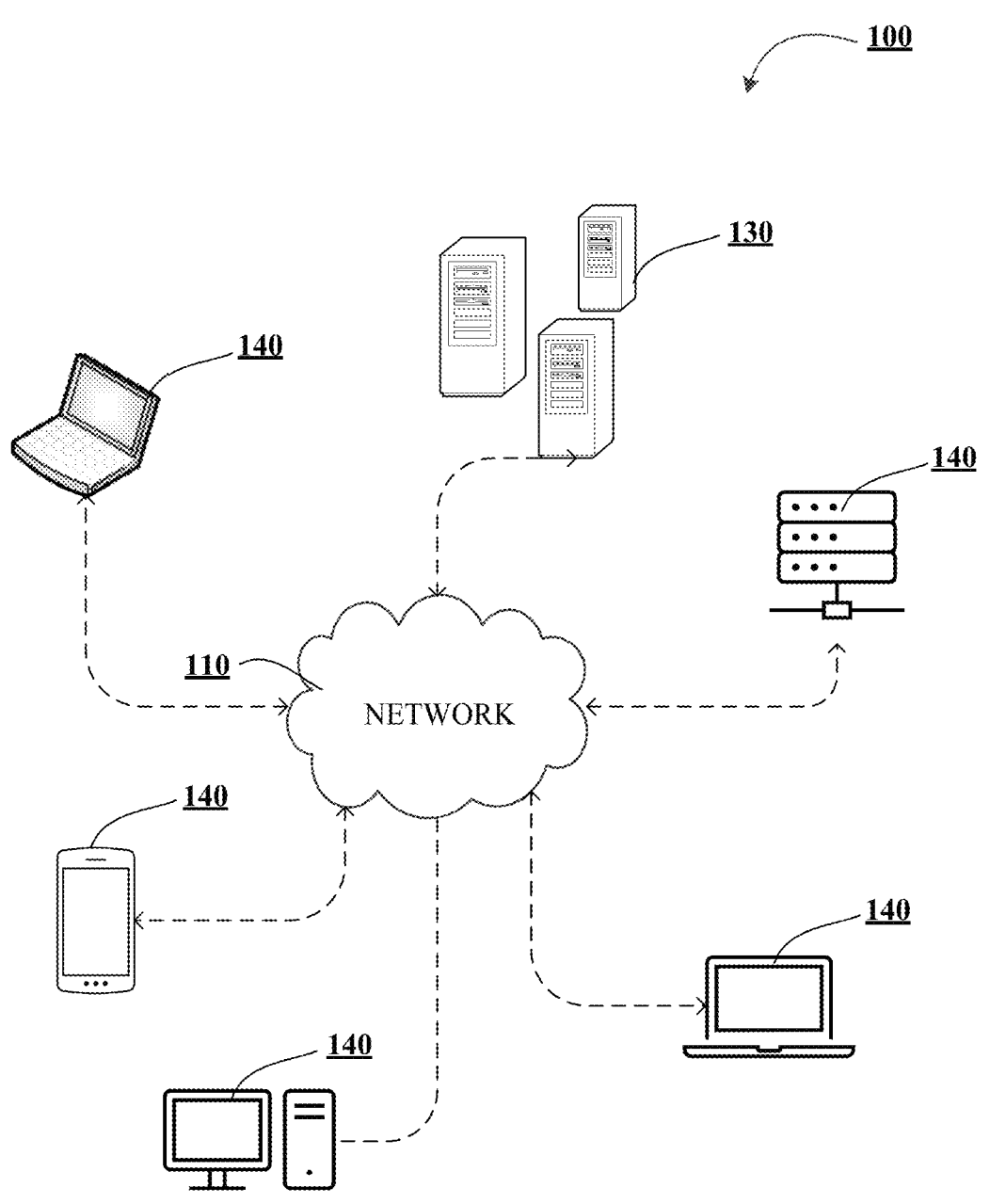
Figure 1B:
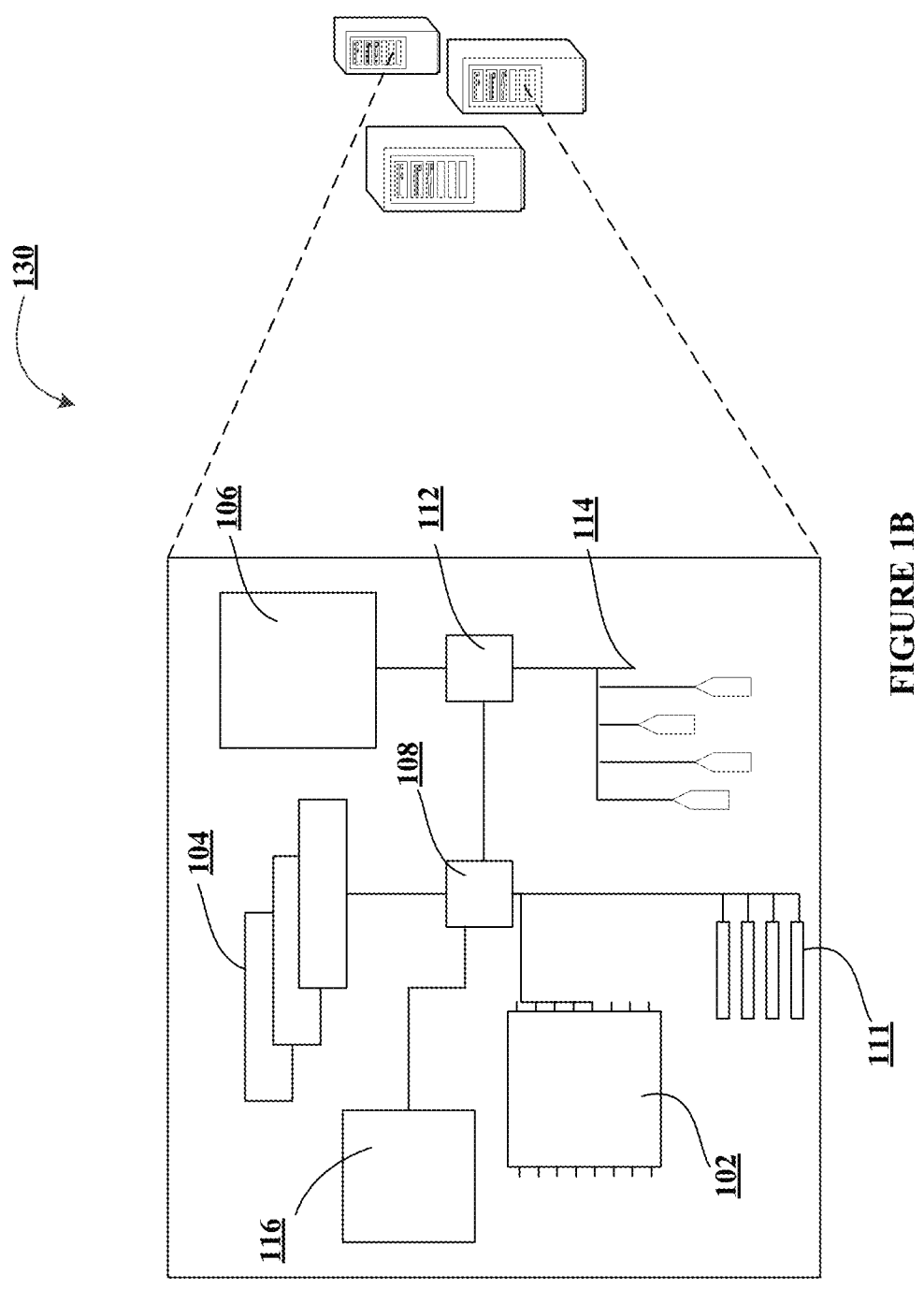
Figure 1C:
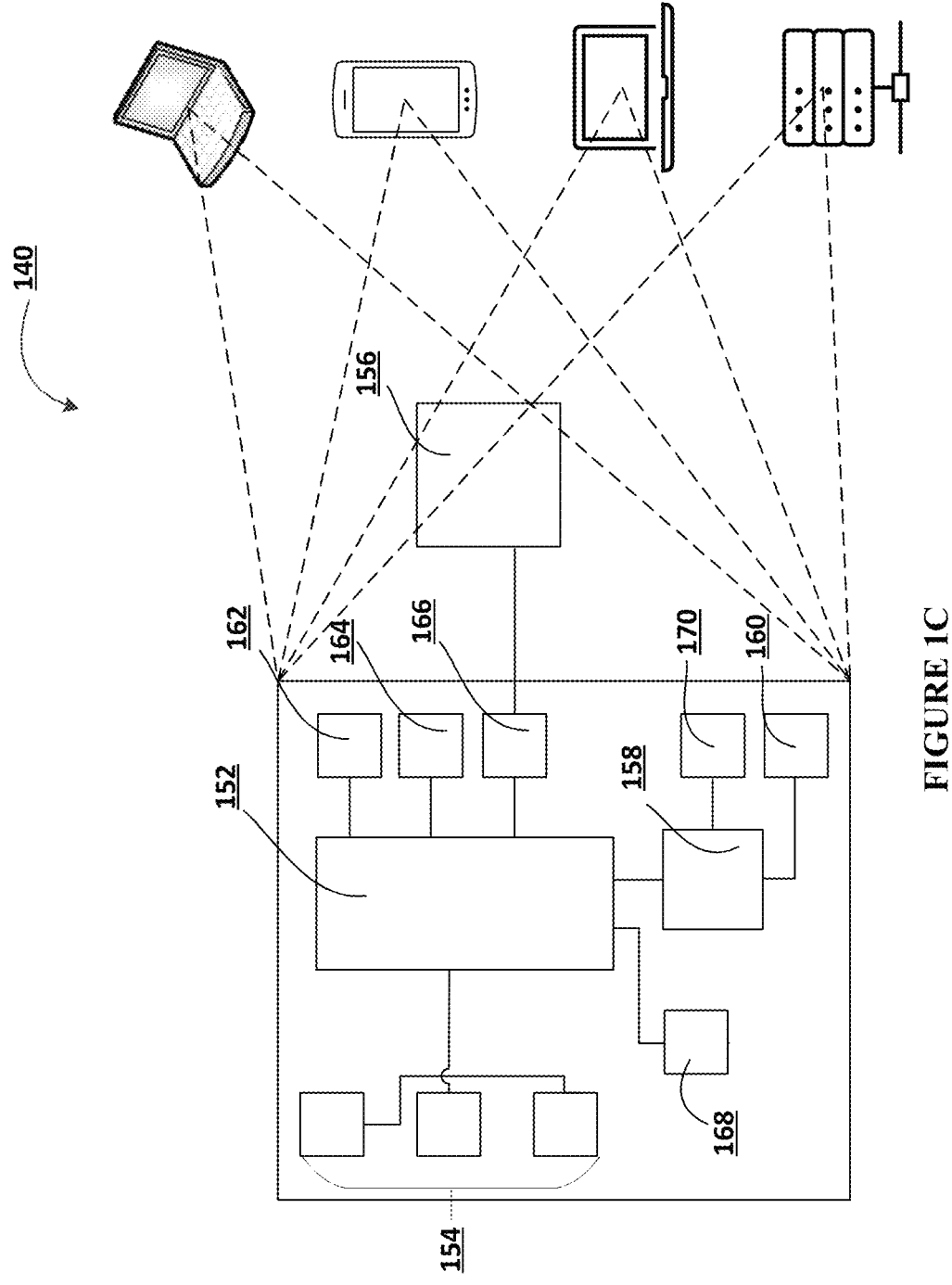
Figure 2A:
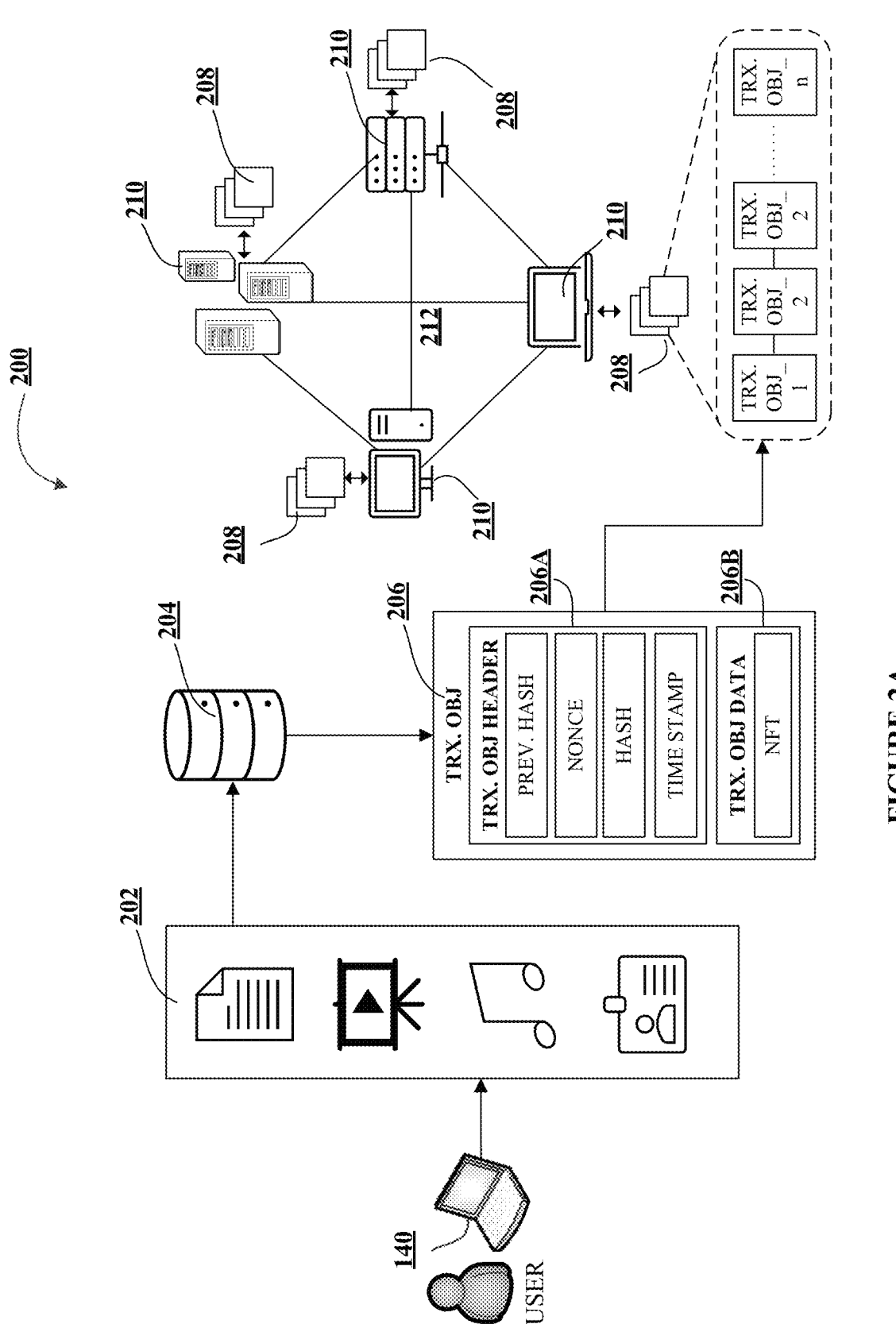
Figure 2B:
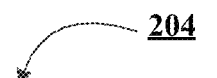
Figure 3:
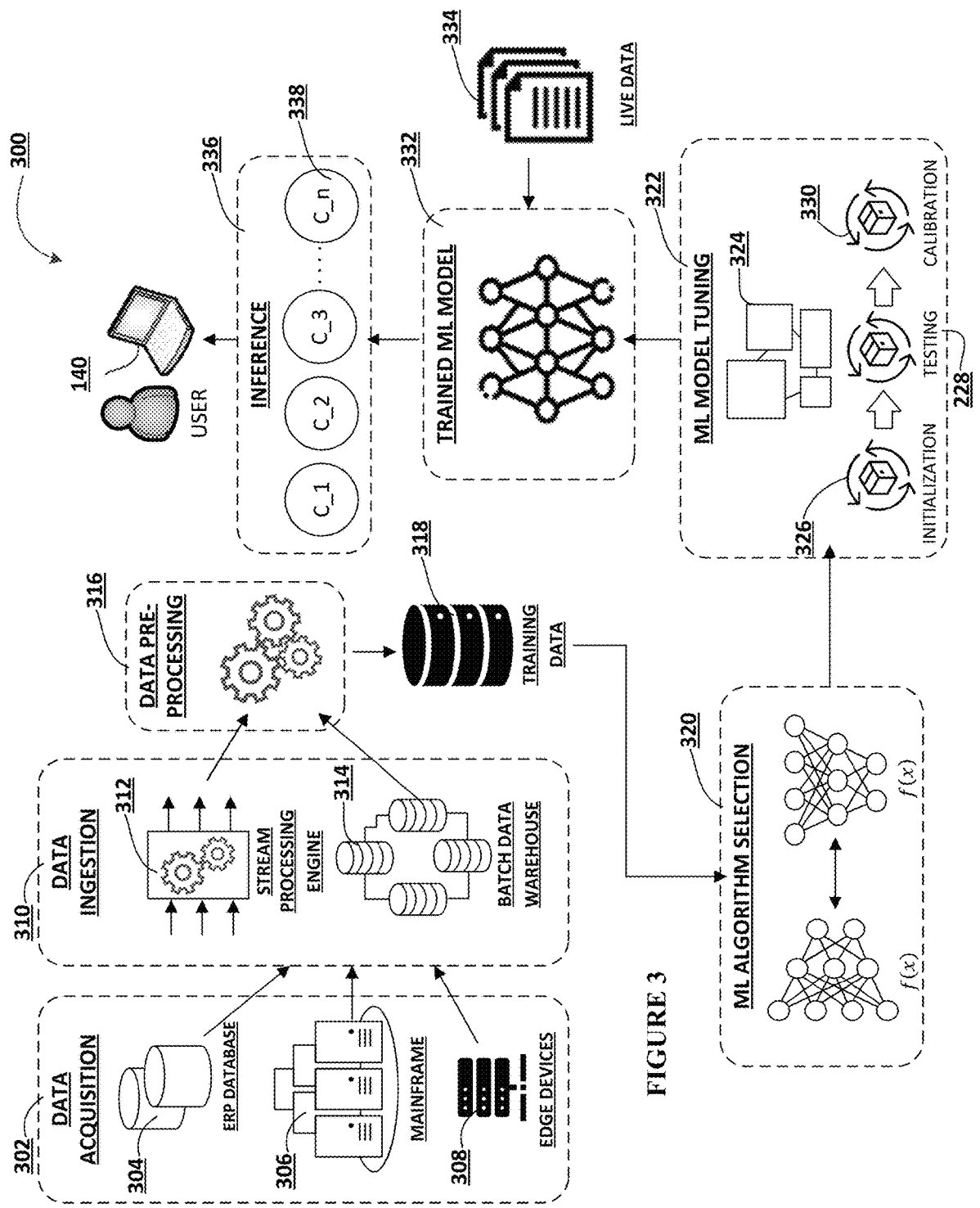

FIGS. 1A-1C illustrates technical components of an exemplary distributed computing environment for secure apparatuses to share and deploy machine build programs utilizing unique hash tokens, in accordance with an embodiment of the disclosure;

FIG. 2A illustrates an exemplary process of creating an NFT 200, in accordance with an embodiment of the invention;

FIG. 2B illustrates an exemplary NFT 204 as a multi-layered documentation of a resource, in accordance with an embodiment of an invention;

FIG. 3 illustrates an exemplary machine learning (ML) subsystem architecture 300, in accordance with an embodiment of the invention; and FIG. 4 illustrates various system components for secure apparatuses to share and deploy machine build pro-grams utilizing unique hash tokens, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein, "non fungible token" (NFT) may refer to a type of digital resource that represents ownership or proof of authenticity for a unique item, software, or piece of content, typically on a blockchain. The NFT may not represent a physical object at all and may instead be a unique digital artifact or metadata stored on a decentralized network. This uniqueness differentiates NFTs from cryptocurrencies, where each unit or "token" is interchangeable and identical to the next, akin to a traditional monetary currency. Instead, each NFT is distinct and not interchangeable with any other token, maintaining its individuality and rarity. Within the realm of security and software development, NFTs may be utilized to authenticate and verify the integrity of a build program. NFTs could be employed to create an immutable signature or digital footprint of the software at the time of its creation or during significant updates.

Upon each new build or update of a program, a unique NFT could be created that represents the exact state of the software at that point in time. This NFT could encapsulate important data such as the hash of the software code, the build version, timestamp, and possibly the identities of the developers involved. The NFT can then be recorded on a blockchain network, establishing a permanent and unalterable record of the software's state at that specific moment.

When the program needs to be verified for its authenticity, its current state could be compared against the NFTs recorded on the blockchain. By checking the NFTs associated with the program, anyone could verify if the current build matches the recorded, authenticated version, thereby ensuring that the software has not been tampered with or illicitly modified since its last known authentic build. This application of NFTs provides an enhanced level of security and trust, allowing for transparent auditing of software builds, and enabling detection of unauthorized changes. This methodology could significantly enhance software integrity verification processes, particularly in highly sensitive environments where software authenticity and security are of paramount importance.

Current or conventionally available processes of updating software for resource machines, which involves entities sending build packages to vendors via flash drives, poses significant chances for malfeasance, including the potential for alteration by malicious actors, necessitating the development of a zero-trust technical method to ensure secure deployment to the resource machines. Applicant has identified a number of deficiencies and problems associated with secure apparatuses to share and deploy machine build programs utilizing unique hash tokens Through applied effort, ingenuity, and innovation, many of these identified problems have been solved by developing solutions that are included in embodiments of the present disclosure, many examples of which are described in detail herein.

Systems, methods, and computer program products are provided for secure apparatuses to share and deploy machine build programs utilizing unique hash tokens. The present invention introduces an intelligent apparatus that facilitates and enforces a zero-trust technical method for secure resource machine build deployment. This secure technical procedure utilizes non-fungible tokens (NFTs) to deploy resource machine build programs on target resource machines via universal serial bus (USB) flash drives. To assure the secure deployment of the build program, a portion of the program is converted into a first NFT (NFT1) and stored within the USB flash drive. The vendor then uses this USB flash drive on the target resource machine to generate a second NFT (NFT2). These two NFTs combine to generate a third NFT (NFT3) that encompasses the fully deployable resource machine build program. A controlling smart contract manages NFT1, NFT2, and NFT3 and contains predefined rules for build deployment such as the number of times a build can be copied, specific resource machine numbers for which the build program will execute, build auto purging, etc.

The method employs NFTs uniquely by integrating two NFT tokens-one delivered embedded in the USB flash drive and one generated in real-time during the interaction between the resource machine and the USB flash drive—to generate a resource machine build activation NFT. The entity-delivered resource machine build deployment NFT1, embedded in the USB flash drive, represents an ownership certificate for the delivered resource machine build program from the entity's end. Simultaneously, the interaction between the resource machine and the USB flash drive generates NFT2, which represents an ownership certificate for the resource machine build owned by the vendor. The integrated resource machine build activation NFT represents combined ownership of the entity and vendor to securely deploy the build on the resource machine.

The invention uniquely facilitates and enforces a zero-trust technical method for secure resource machine build deployment leveraging non-fungible tokens. This secure technical procedure utilizes NFTs to deploy resource machine build programs on target resource machines via USB flash drives validated through a unique NFT combination. The entity delivers NFT1 in a USB flash drive, which represents an ownership certificate for the delivered build flash drive from the entity's end. A live session (once the vendor plugs the drive into a resource machine) generates NFT2, representing an ownership certificate for the build flash drive owned by the vendor. The integrated NFT represents the combined ownership of the entity and vendor, thus fully activating the build for deployment on the resource machine. The invention also includes a dynamic smart contract that manages NFT1, NFT2, and the integrated NFT3 based on predefined rules to ensure build program validation. This invention includes a unique USB flash drive preparation and build orchestration program that manages the end-to-end deployment procedure, coupled with live session NFT validation. The invention also incorporates an apparatus to monitor the resource machine build program, managing the interaction between the USB flash drive and the resource machine to ensure seamless deployment. NFT-based geofencing enables the resource machine build program to deploy and execute only on targeted resource machines located in specific geographical regions. The invention comprises several key components that collectively ensure secure resource machine build deployment.

A resource machine build orchestration module is a crucial component, responsible for coordinating the various operations necessary for build deployment. This module manages the resource machine build program, directing and controlling the process of transforming the build program into Non-Fungible Tokens (NFTs), and ensures the appropriate distribution and utilization of these tokens. Subsequently, A flash drive preparation module prepares the USB flash drive that serves as the vehicle for build deployment. This module embeds the initial NFT (NFT1) into the USB flash drive, which represents the ownership certificate for the delivered resource machine build program from the entity's end. A dynamic NFT generator module is tasked with the creation of the second NFT (NFT2), which is generated in real-time during the interaction of the resource machine with the USB flash drive. The NFT2 serves as an ownership certificate for the resource machine build owned by the vendor. A dynamic smart contract module is integrated to manage the interactions between NFT1, NFT2, and the resultant integrated NFT (NFT3). This module contains predefined rules for build deployment and operates in a manner that ensures the build program's validation based on these rules. To manage the interactions and the life cycle of the various NFTs involved, an NFT orchestration module is employed. This module coordinates the operations of NFT1, NFT2, and NFT3, facilitating their generation, integration, and eventual utilization. To ensure the validity and integrity of the NFTs, an NFT validation module is incorporated. This module verifies the NFTs against their ownership certificates and confirms the legitimacy of the build activation. The build monitoring module oversees the interaction between the USB flash drive and the resource machine, providing real-time supervision to ensure the seamless deployment of the resource machine build program. Finally, the build activation module is responsible for the ultimate activation and deployment of the resource machine build program. This module manages the combination of NFT1 and NFT2 to generate NFT3, which in turn activates the build for deployment on the resource machine.

What is more, the present disclosure provides a technical solution to a technical problem. An Automatic Teller Machine (ATM) serves as a key medium for users to execute transactions. The hardware infrastructure of these ATMs is currently under the supervision of specified vendors. The prevalent practice for updating ATM software involves the bank dispatching the ATM build package to the vendor via USB flash drives. The vendors then undertake the responsibility of deploying these packages on the designated machines. As described herein, the technical problem includes significant security vulnerabilities presented by current methods of deploying build packages. The current practice lacks a reliable verification system to guarantee the consistency between the bank-provided build package and the version that is ultimately deployed on the ATMs. Furthermore, the data on the USB flash drives could potentially be manipulated by malicious entities during the transfer process.

Therefore, there is an exigent need to architect and implement a zero-trust technical strategy to bolster the security of ATM build deployments, effectively mitigating the aforementioned chances of negative outcomes. The proposed methodology introduces an intelligent apparatus designed to embody and operationalize a zero-trust technical strategy for secure ATM build deployments. This strategy effectively negates trust-related vulnerabilities in the software deployment process, thus enhancing its overall security. Central to this method is the utilization of Non-Fungible Tokens (NFTs), an emerging digital resource class, to govern the deployment of the ATM build program onto the targeted Automatic Teller Machines using USB flash drives. By leveraging the unique properties of NFTs, the procedure enhances the security, verifiability, and integrity of the software deployment process . . . . In particular, the present invention is an improvement over existing solutions to the issue of secure build program deployment on ATMs (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii)

removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for secure apparatuses to share and deploy machine build programs utilizing unique hash tokens 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2A illustrates an exemplary process of creating an NFT 200, in accordance with an embodiment of the invention. As shown in FIG. 2A, to create or "mint" an NFT, a user (e.g., NFT owner) may identify, using a user input device 140, resources 202 that the user wishes to mint as an NFT. Typically, NFTs are minted from digital objects that represent both tangible and intangible objects. These resources 202 may include a piece of art, music, collectible, virtual world items, videos, real-world items such as artwork and real estate, or any other presumed valuable object. These resources 202 are then digitized into a proper format to produce an NFT 204. The NFT 204 may be a multi-layered documentation that identifies the resources 202 but also evidences various transaction conditions associated therewith, as described in more detail with respect to FIG. 2A.

To record the NFT in a distributed ledger, a transaction object 206 for the NFT 204 is created. The transaction object 206 may include a transaction header 206A and a transaction object data 206B. The transaction header 206A may include a cryptographic hash of the previous transaction object, a nonce-a randomly generated 32-bit whole number when the transaction object is created, cryptographic hash of the current transaction object wedded to the nonce, and a time stamp. The transaction object data 206B may include the NFT 204 being recorded. Once the transaction object 206 is generated, the NFT 204 is considered signed and forever tied to its nonce and hash. The transaction object 206 is then deployed in the distributed ledger 208. At this time, a distributed ledger address is generated for the transaction object 206, i.e., an indication of where it is located on the distributed ledger 208 and captured for recording purposes. Once deployed, the NFT 204 is linked permanently to its hash and the distributed ledger 208, and is considered recorded in the distributed ledger 208, thus concluding the minting process As shown in FIG. 2A, the distributed ledger 208 may be maintained on multiple devices (nodes) 210 that are authorized to keep track of the distributed ledger 208. For example, these nodes 210 may be computing devices such as system 130 and end-point device(s) 140. One node 210 may have a complete or partial copy of the entire distributed ledger 208 or set of transactions and/or transaction objects on the distributed ledger 208. Transactions, such as the creation and recordation of a NFT, are initiated at a node and communicated to the various nodes. Any of the nodes can validate a transaction, record the transaction to its copy of the distributed ledger, and/or broadcast the transaction, its validation (in the form of a transaction object) and/or other data to other nodes.

FIG. 2B illustrates an exemplary NFT 204 as a multi-layered documentation of a resource, in accordance with an embodiment of an invention. As shown in FIG. 2B, the NFT may include at least relationship layer 252, a token layer 254, a metadata layer 256, and a licensing layer 258. The relationship layer 252 may include ownership information 252A, including a map of various users that are associated with the resource and/or the NFT 204, and their relationship to one another. For example, if the NFT 204 is purchased by buyer B1 from a seller S1, the relationship between B1 and S1 as a buyer-seller is recorded in the relationship layer 252. In another example, if the NFT 204 is owned by O1 and the resource itself is stored in a storage facility by storage provider SP1, then the relationship between O1 and SP1 as owner-file storage provider is recorded in the relationship layer 252. The token layer 254 may include a token identi-fication number 254A that is used to identify the NFT 204. The metadata layer 256 may include at least a file location 256A and a file descriptor 256B. The file location 256A may provide information associated with the specific location of the resource 202. Depending on the conditions listed in the smart contract underlying the distributed ledger 208, the resource 202 may be stored on-chain, i.e., directly on the distributed ledger 208 along with the NFT 204, or off-chain, i.e., in an external storage location. The file location 256A identifies where the resource 202 is stored. The file descrip-tor 256B may include specific information associated with the source itself 202. For example, the file descriptor 256B may include information about the supply, authenticity, lineage, provenance of the resource 202. The licensing layer 258 may include any transferability parameters 258B asso-ciated with the NFT 204, such as restrictions and licensing rules associated with purchase, sale, and any other types of transfer of the resource 202 and/or the NFT 204 from one person to another. Those skilled in the art will appreciate that various additional layers and combinations of layers can be configured as needed without departing from the scope and spirit of the invention.

FIG. 3 illustrates an exemplary machine learning (ML) subsystem architecture 300, in accordance with an embodi-ment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is trans-ported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Plan-ning (ERP) databases that host data related to day-to-day business activities such as accounting, procurement, project management, exposure management, supply chain opera-tions, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acqui-sition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream process-ing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced inte-gration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1$, $C\_2$ . . . $C\_n$ 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1$, $C\_2$ . . . $C\_n$ 338) live data 334 based on how similar they are to one another to solve exploratory challenges where little is known about the data, provide a description or label (e.g., $C\_1$, $C\_2$ . . . $C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

FIG. 4 illustrates a process flow for secure apparatuses to share and deploy machine build programs utilizing unique hash tokens, in accordance with an embodiment of the disclosure. The system of the invention includes an intelligent apparatus designed to facilitate and enforce a zero-trust technical method. This system ensures the secure deployment of ATM builds by leveraging the unique capabilities of non-fungible tokens. In the context of cryptography, a zero-trust system represents a security model predicated on the principle of maintaining strict access controls and not trusting anything inside or outside its perimeters by norm. The core tenet of zero-trust is "never trust, always verify," meaning that irrespective of where a request originates from or what resource it accesses, it must not automatically be trusted. This model demands all actions on the network to be authenticated, authorized, and validated before being processed.

Zero-trust models require robust cryptographic measures to validate and secure all network transactions. These measures could include multifactor authentication, encryption, and cryptographic keys. Non-fungible tokens (NFTs), due to their uniqueness and indivisibility, can offer significant benefits for implementing a zero-trust system for verifying software builds. In some embodiments, each software build can be associated with a unique NFT during the build process. This NFT, which resides on a distributed register, can act as a cryptographic seal or signature that verifies the integrity and the authenticity of the software build. The NFT acts as an immutable record of the software build at a particular point in time. In some embodiments, changes to the software build after the NFT has been created may break the link between the NFT and the build, indicating that the software has been altered.

When deploying the software, the system can check the associated NFT on the distributed register. The system, following the zero-trust principles, is engineered not trust the software build by norm. It would verify the authenticity and integrity of the software build by matching the NFT on the blockchain with the software build. If they match, the software is verified and may be deployed. If they do not match, the system may consider the software as tampered or compromised and deny the deployment. Moreover, in some embodiments, NFTs could also enable a robust tracking mechanism, facilitating traceability of all versions of software builds, thereby enhancing the visibility and control of the software deployment process. In some embodiments, NFTs may confirm the identity of the entities involved in the build process, adding an additional layer of security.

Depicted in FIG. 4 is an ATM build program activation apparatus 400, which includes various components and subcomponents designed to generate multiple NFT payloads for secure build program activation. As shown in block 402, the ATM build program activation apparatus 400 comprises an ATM build orchestration module. It is understood that the ATM build orchestration module manages the end-to-end deployment procedure and is coupled with live session NFT validation. Also shown in FIG. 4 is physical drive preparation module 404. This module typically comprises software that prepares, formats, and copies necessary data onto the USB drive. First, the physical USB drive should be inspected to ensure that it's functional, has the necessary storage capacity, and doesn't have any apparent physical damage. The USB drive is then inserted into a secure and trusted computer system where the drive preparation module is installed. The drive preparation module will detect the inserted drive, retrieve its specifications, and analyze the disk structure, including its partitions and file systems. After analysis, the drive preparation module will format the USB drive. Formatting is the process of preparing the drive for data storage, which includes creating a new file system. This process usually erases all existing data on the drive. The specific file system chosen (e.g., FAT32, NTFS, exFAT, or the like) often depends on the compatibility requirements of the system where the drive will be used. Post-formatting, the module will copy the necessary files for the build-program onto the USB drive. These files could include an installer, configuration files, scripts, or even a complete system image, depending on the specific requirements of the build-program. To ensure that the data has been copied correctly, the module may perform a verification process. This process compares the original data with the copied data on the USB drive. Depending on the security requirements, the module might also implement cryptographic measures such as drive encryption, making the data on the USB unreadable without the correct decryption key. In some embodiments, this step is critical, especially if sensitive data is being transported.

Also shown in FIG. 4 is non-fungible token (NFT) generator module 406. Creating a Non-Fungible Token (NFT) certificate for a build-program deployment involves using the non-fungible token (NFT) generator module 406. This module is essentially a software tool or system component that interacts with the blockchain network to mint or create NFTs. In some embodiments, this involves the steps of gathering and preparing metadata associated with the build-program. This can include details such as the name of the build-program, its version, timestamp, hash, creator, and other relevant details, or the like. This metadata forms the basis of the unique properties of the NFT. The metadata is typically encapsulated in a JSON object, and, in some embodiments, follows the EIP-3664 metadata standard. This JSON file will include properties that describe the build-program and may also contain a link to an external file where more detailed information about the build-program can be stored. The JSON metadata file is then uploaded to a decentralized file storage system like Interplanetary File System (IPFS). Uploading to such a system ensures that the metadata is stored in a decentralized, tamper-proof manner. The storage system returns an IPFS hash which points to the uploaded metadata. Using the distributed register or ledger network, the NFT generator module interacts with a smart contract, which, in some embodiments, may be an ERC-3664 compliant smart contract, via dynamic smart contract module 408. This interaction is often performed using a library such as Web3.js or Ethers.js. A Smart Contract module is a key component in distributed ledger systems, specifically in the deployment of smart contracts. These contracts are self-executing, blockchain-based contracts where the terms of the agreement are written into code.

A smart contract is written, usually in a language like Solidity or Vyper that the distributed ledger understands. This contract encapsulates the rules of interaction and the logic related to the build-program. It might include functions for tasks such as verifying the build-program, updating its status, managing permissions, and handling the creation of associated NFTs. Once the smart contract is written, it is then compiled by the system. Compilation converts the high-level code into bytecode, which can be executed on the Virtual Machine (EVM). Any errors in the code should be resolved during this phase. The compiled smart contract is then deployed onto the distributed ledger using the module 408. The module constructs a special kind of transaction that contains the smart contract's bytecode in the data field. It then sends this transaction to the network. The transaction must be signed with the private key of the account initiating the deployment. Signing verifies the transaction initiator's identity and helps to secure the transaction. Once the signed transaction is broadcasted to the network, it is processed and confirmed by the distributed ledger nodes. This process involves nodes selecting the transaction from the pool, verifying it, and including it in a new block on the blockchain. When the transaction is confirmed, the smart contract is considered deployed. The network automatically assigns an address to the smart contract, which is then returned by the module 408. This address is unique to the contract and is used to interact with it. After deployment, the smart contract can be interacted with by sending transactions to its address. These transactions can call the functions defined in the contract. The module 408 plays a crucial role in deploying and interacting with smart contracts on the distributed ledger. These contracts become an immutable part of the blockchain, enforcing the rules and logic they were programmed with, and hence play a key role in ensuring the integrity of the build-program deployment process.

The module 406 calls the smart contract's mint function, passing in the address to which the NFT should be assigned and the IPFS hash from the previous step. The request to mint the NFT must be signed using the private key of the address initiating the transaction. This process verifies the identity of the transaction initiator and secures the transaction. The signed transaction is broadcast to the network. It is then processed and confirmed by the network's nodes. Once confirmed, the NFT is minted and ownership is assigned to the specified address. After the NFT is minted, the unique token ID of the newly created NFT can be retrieved from the transaction receipt. This token ID can be used for future references to the NFT. Through this process, the NFT generator module creates a unique NFT certificate for each build-program deployment, providing a decentralized, tamper-proof record of each software build. It's important to note that while NFTs can enhance the security and traceability of build-program deployments, care should be taken to secure the private keys used in the process to prevent unauthorized minting of NFTs.

Also depicted in FIG. 4 as a component of the ATM build program activation apparatus 400 is NFT orchestration module 410. The NFT orchestration module 410, in the context of build-program deployment, is a system component designed to coordinate and manage various tasks involved in the creation, assignment, and management of Non-Fungible Tokens (NFTs) associated with the software builds. This module can interact with other components such as the NFT generator module 406 and the smart contract module 408, back end entity systems, third party systems, and with the distributed ledger network itself. When a new build-program is ready for deployment, the NFT orchestration module 410 initiates the process of creating a new NFT. It does this by interacting with the NFT generator module 406, providing it with the necessary metadata about the build-program. Once the NFT is created by the NFT generator module 406, the NFT orchestration module 410 receives the details of the newly created NFT. This typically includes the unique token ID of the NFT and other metadata. The NFT orchestration module 410 then associates the NFT with the corresponding build-program. This could involve storing the relationship in a database or in a smart contract on the blockchain.

The NFT orchestration module 410 is also responsible for managing the lifecycle of the NFT. This can include tasks such as transferring the NFT to different owners (e.g., different stages of the build-program deployment process, or the like), updating the NFT's metadata if the build-program changes, and potentially burning (i.e., destroying) the NFT if the build-program is decommissioned. As part of its duties, the NFT orchestration module 410 may need to interact with smart contracts on the distributed ledger. For example, it may call a function in a smart contract to update the status of the build-program based on the NFT, or to verify the integrity of the build-program using the NFT. The NFT Orchestration Module also keeps records of all NFTs it manages. These records can include the history of each NFT, such as when it was created, what build-program it's associated with, and any transfers or changes it has undergone. Overall, the NFT orchestration module 410 serves as the central point of control for all tasks related to NFTs in the build-program deployment process. By coordinating these tasks, it ensures that the NFTs accurately reflect the state of the build-programs and that the benefits of using NFTs (e.g., improved traceability and security, or the like) are fully realized. In sum, this module coordinates the operations of NFT1, NFT2, and NFT3. It might be responsible for calling the various smart contract functions to create, validate, and integrate the NFTs, which involves using a library like web3.js and a programming language like JavaScript or Python, or the like.

As further shown in FIG. 4, an NFT validation module 412, in the context of build-program deployment, refers to a system component that is responsible for validating the authenticity and integrity of Non-Fungible Tokens (NFTs) associated with software builds. The validation process involves cross-verifying the data stored in the NFT with the corresponding build-program. The NFT validation module 412 starts by retrieving the metadata of the NFT associated with a particular build-program. This metadata, which could include details such as the build-program's name, version, timestamp, hash, and creator, is stored on the distributed ledger and can be accessed using the unique token ID of the NFT. Simultaneously, the module retrieves the current information of the corresponding build-program. This information, which should match the NFT metadata, could be sourced from a database, a file system, or another trusted source. The NFT validation module 412 then compares the NFT metadata with the current build-program information. This comparison involves checking whether all details match as expected. If all details match, the NFT is considered valid, indicating that the build-program has not been altered since the NFT was created. However, if any discrepancies are found, the NFT is considered invalid. This could signal a potential unauthorized change or error in the build-program. Based on the validation result, the module can then decide on the next course of action. If the NFT is valid, the build-program could proceed to the next stage of deployment. However, if the NFT is invalid, the module could halt the deployment process, raise an alert, and potentially initiate an investigation to discover the source of the discrepancy. In essence, the NFT validation module 412 plays a crucial role in ensuring the authenticity and integrity of the build-program deployment process. It utilizes the immutable and tamper-evident properties of NFTs to detect any unauthorized changes or errors in the software builds, thus helping to maintain a high level of trust and security in the deployment process. In sum, this module ensures the validity and integrity of the NFTs. It uses cryptographic techniques to verify the digital signatures or hashes included in the NFT payloads, which involves using a cryptographic library and a programming language like Python or Java.

Moving further to block 414, deep learning module 414, in the context of build-program deployment, is a system component that employs deep learning techniques to improve the build-program deployment process. Deep learning, a subset of machine learning, uses neural networks with many layers (hence 'deep') to learn from data and make predictions or decisions without being explicitly programmed to perform the task. The exact role of the deep learning module 414 can vary depending on the specific requirements of the build-program deployment process. The first step involves training a deep learning model on historical build-program deployment data. This data could include details about past deployments, such as the size of the build, the time it took, who initiated it, and whether it was successful. The model learns to recognize the typical patterns of a 'normal' deployment. The deep learning module 414 continues to learn and update its model as new build-program deployments occur. This enables it to adapt to changes in the deployment process over time. During each build-program deployment, the module uses the trained model to analyze the current deployment. It compares the characteristics of the current deployment to the 'normal' patterns it has learned. If the current deployment deviates significantly from the normal patterns, it's flagged as an anomaly.

If an anomaly is detected, the deep learning module 414 can trigger alerts to inform relevant personnel about the potential issue. Depending on the severity of the anomaly and the system's configuration, it may also take automated action to mitigate potential for harm, such as pausing the deployment or isolating the affected system. After each deployment, the deep learning module 414 can analyze the deployment data to learn from it and improve its future predictions. It can also provide insights to the team about the deployment process, helping them to identify potential areas for improvement. By employing deep learning techniques, the deep learning module 414 can provide an additional layer of security and reliability to the build-program deployment process. It can help to detect potential issues that might otherwise be difficult to spot and react quickly to mitigate any potential harm.

Moreover, a build monitoring module 416, in the context of build-program deployment, refers to a system component that oversees the entire build-program deployment process. Its key function is to track the status, progress, and potential issues during the build-program's deployment. By doing so, it ensures a smooth and successful deployment while minimizing the likelihood of unanticipated problems or downtime. The module constantly checks the status of the build-program. It monitors various aspects of the build process such as the progress of the build, whether all the necessary components are correctly installed, whether the build is proceeding as per the schedule, etc. It also tracks key metrics like central processing unit (CPU) usage, memory usage, network bandwidth, disk usage, or the like, which are crucial for understanding the performance of the build-program. These metrics can give insights into whether the build-program is operating efficiently or if there are any performance bottlenecks that need to be addressed. The build monitoring module 416 is also responsible for identifying any errors or anomalies during the build process. It can flag any unexpected behavior or deviations from the norm, such as sudden spikes in resource usage, unanticipated delays, or failures in any part of the build-program. If the module detects any issues or anomalies, it can generate alerts to inform the relevant teams. These alerts could be sent via email, SMS, or other notification systems, allowing a team to quickly respond to potential problems. The build monitoring module 416 logs all significant events and metrics during the build-program's deployment. This information can be used for post-deployment analysis to understand the performance of the build-program and identify areas for improvement. It can also provide real-time reporting on the build's status to keep all engineers and developers informed. The build monitoring module 416 often needs to interact with other system components, such as the deep learning module 414 for anomaly detection, the NFT validation module 412 for validating NFTs, or the NFT orchestration module 410 for managing NFTs. Through these tasks, the build monitoring module 416 plays a crucial role in ensuring a smooth and efficient build-program deployment process. It provides visibility into the process, allows for quick identification and resolution of issues, and provides valuable data for improving future deployments. This module monitors the interaction between the USB flash drive and the resource machine, which would in some embodiments involves using system monitoring tools and a programming language like Python or Bash.

Shown to the right of the various components 402-416, also illustrated in FIG. 4 are NFT payload 1 418, NFT payload 2 420, and NFT payload 3 422. In the context of the build-program deployment process described, NFT payload 1 418 (NFT1), NFT payload 2 420 (NFT2), and NFT payload 3 422 (NFT3) refer to the data or information encapsulated within the respective Non-Fungible Tokens (NFTs). These payloads could include unique identifiers, ownership certificates, and other metadata about the build-program and its deployment process.

NFT Payload 1 418 (NFT1): This payload is embedded into a USB flash drive and represents the ownership certificate for the delivered resource machine build program from the entity's end. It essentially serves as proof of ownership and authenticity for the build-program. The payload could include information such as the build-program's name, version, creator, creation timestamp, and a unique identifier. It might also include a hash or digital signature of the build-program to ensure its integrity.

NFT Payload 2 420 (NFT2): This payload is dynamically generated when the resource machine interacts with the USB flash drive. It serves as an ownership certificate for the resource machine build owned by the vendor. In addition to the ownership details, this payload might also include information about the resource machine, such as its identifier, specifications, and the timestamp of the interaction. The creation of NFT2 could represent the transfer of ownership of the build-program from the entity to the vendor.

NFT Payload 3 422 (NFT3): This payload is generated by combining NFT1 and NFT2 and activates the build for deployment on the resource machine. The payload could include all the information from NFT1 and NFT2, effectively linking the build-program, the entity, and the vendor. It might also include additional details about the deployment, such as the deployment timestamp, the deployment status, and any relevant configuration settings.

The generation, integration, and validation of these NFTs and their payloads are managed by the various modules described, ensuring a secure and traceable build-program deployment process. The NFT payloads provide a tamper-proof record of the build-program's path from the entity to the vendor, creating trust and accountability in the deployment process. Additionally, the smart contract associated with the NFTs NFT1, NFT2, and NFT3 may include reviewing a code and transaction history of a smart contract associated with NFT1, NFT2, and NFT3 via querying the distributed ledger to retrieve a bytecode of the smart contract. Once the bytecode is retrieved, the system may analyze the bytecode to confirm that the smart contract operates as expected. The process of querying the distributed ledger to retrieve a bytecode of the smart contract and subsequently analyzing it for confirmation may include initiating a query to the distributed ledger, seeking the bytecode of the smart contract. This involves accessing the appropriate data structures or APIs provided by the distributed ledger technology.

The system interacts with the distributed ledger, specifically targeting the relevant transaction or block that contains the smart contract bytecode. This query can involve querying specific nodes or verifying the information from multiple nodes in the distributed network. Upon successfully retrieving the bytecode from the distributed ledger, the system obtains the necessary data to proceed with the analysis. This bytecode represents the compiled form of the smart contract. The system performs an analysis of the retrieved bytecode to confirm whether the smart contract functions as intended. This analysis may involve various techniques, such as static analysis or dynamic execution, to assess the code's behavior, security, and adherence to expected standards. The system evaluates the bytecode against predefined expectations or specifications to verify that the smart contract operates as anticipated. This process may involve comparing the bytecode against a set of predefined rules, running simulations, or executing test cases to ensure the desired behavior.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for secure apparatuses to share and deploy machine build programs utilizing unique hash tokens, the system comprising:

a processing device;

a non-transitory storage device containing instructions when executed by the processing device, causes the processing device to perform the steps of:

generating a first non-fungible token comprising a resource machine build-program, wherein the resource machine build-program comprises software program designed to execute one or more functions of an automated teller machine (ATM);

storing the first non-fungible token into a Universal Serial Bus (USB) flash drive;

generating a second non-fungible token during an interaction of a resource machine with the USB flash drive, wherein the second non-fungible token includes data representing an ownership certificate for the resource machine build owned by a vendor;

generating a resultant integrated third non-fungible token, wherein the third non-fungible token is generated by combining the first non-fungible token and the second non-fungible token;

confirming integrity of the first non-fungible token, the second non-fungible token, and the third non-fungible token by computing a hash of data associated with each non-fungible token and comparing the hash to metadata associated with each non-fungible token; and deploying the resource machine build-program on the resource machine, wherein the activation is triggered by the generation of the third non-fungible token.

2. The system of claim 1, wherein the first non-fungible token includes data representing an ownership certificate for the resource machine build-program.

3. The system of claim 1, wherein the non-transitory storage device containing instructions when executed by the processing device, causes the processing device to manage one or more interactions between the first non-fungible token, the second non-fungible token, and the third non-fungible token, wherein the third non-fungible token is generated by combining the first non-fungible token and the second non-fungible token.

4. The system of claim 1, wherein the non-transitory storage device containing instructions when executed by the processing device, causes the processing device to perform the steps of:

querying a distributed ledger to confirm existence and properties of the first non-fungible token, the second non-fungible token, and the third non-fungible token retrieving metadata associated with each non-fungible token, and comparing this metadata with any expected metadata;

querying the distributed ledger to verify ownership of the first non-fungible token, the second non-fungible token, and the third non-fungible token comprising checking a current owner address for each non-fungible token and comparing a current owner address with a claimed owner's address; and reviewing a code of a smart contract associated with first non-fungible token, the second non-fungible token, and the third non-fungible token via querying the distributed ledger to retrieve a bytecode of the smart contract and analyzing the bytecode to confirm that the smart contract operates as expected.

5. The system of claim 1, wherein the non-transitory storage device containing instructions when executed by the processing device, causes the processing device to oversee the interaction between the USB flash drive and the resource machine, comprising monitoring a status, progress, and issues during build-program deployment.

6. The system of claim 1, wherein the non-transitory storage device containing instructions when executed by the processing device, causes the processing device to coordinate operations of the first non-fungible token, the second non-fungible token, and the third non-fungible token including generation, integration, and utilization.

7. A computer program product for secure apparatuses to share and deploy machine build programs utilizing unique hash tokens, the computer program product comprising a non-transitory computer-readable medium comprising code causing an apparatus to:

generate a first non-fungible token comprising a resource machine build-program, wherein the resource machine build-program comprises software program designed to execute one or more functions of an automated teller machine (ATM);

store the first non-fungible token into a Universal Serial Bus (USB) flash drive;

generate a second non-fungible token during an interaction of a resource machine with the USB flash drive, wherein the second non-fungible token includes data representing an ownership certificate for the resource machine build owned by a vendor;

generate a resultant integrated third non-fungible token, wherein the third non-fungible token is generated by combining the first non-fungible token and the second non-fungible token;

confirm an integrity of the first non-fungible token, the second non-fungible token, and the third non-fungible token by computing a hash of data associated with each non-fungible token and comparing the hash to metadata associated with each non-fungible token; and deploy the resource machine build-program on the resource machine, wherein the activation is triggered by the generation of the third non-fungible token.

8. The computer program product of claim 7, wherein the first non-fungible token includes data representing an ownership certificate for the resource machine build-program.

9. The computer program product of claim 7, wherein the code further causes the apparatus to manage one or more interactions between the first non-fungible token, the second non-fungible token, and the third non-fungible token, wherein the third non-fungible token is generated by combining the first non-fungible token and the second non-fungible token.

10. The computer program product of claim 7, wherein the code further causes the apparatus to perform the steps of querying a distributed ledger to confirm existence and properties of the first non-fungible token, the second non-fungible token, and the third non-fungible token retrieving metadata associated with each non-fungible, and comparing this metadata with any expected metadata;

querying the distributed ledger to verify ownership of the first non-fungible token, the second non-fungible token, and the third non-fungible token comprising checking a current owner address for each non-fungible token NFT and comparing a current owner address with a claimed owner's address; and reviewing a code of a smart contract associated with first non-fungible token, the second non-fungible token, and the third non-fungible token via querying the distributed ledger to retrieve a bytecode of the smart contract and analyzing the bytecode to confirm that the smart contract operates as expected.

11. The computer program product of claim 7, wherein the code further causes the apparatus to oversee the interaction between the USB flash drive and the resource machine, comprising monitoring a status, progress, and issues during build-program deployment.

12. The computer program product of claim 7, wherein the code further causes the apparatus to coordinate operations of the first non-fungible token, the second non-fungible token, and the third non-fungible token including generation, integration, and utilization.

13. A method for secure apparatuses to share and deploy machine build programs utilizing unique hash tokens, the method comprising:

generating a first non-fungible token comprising a resource machine build-program, wherein the resource machine build-program comprises software program designed to execute one or more functions of an automated teller machine (ATM);

storing the first non-fungible token into a Universal Serial Bus (USB) flash drive;

generating a second non-fungible token during an interaction of a resource machine with the USB flash drive, wherein the second non-fungible token includes data representing an ownership certificate for the resource machine build owned by a vendor;

generating a resultant integrated third non-fungible token, wherein the third non-fungible token is generated by combining the first non-fungible token and the second non-fungible token;

confirming integrity of the first non-fungible token, the second non-fungible token, and the third non-fungible token by computing a hash of data associated with each non-fungible token and comparing the hash to metadata associated with each non-fungible token; and deploying the resource machine build-program on the resource machine, wherein the activation is triggered by the generation of the third non-fungible token.

14. The method of claim 13, wherein the first non-fungible token includes data representing an ownership certificate for the resource machine build-program.

15. The method of claim 13, wherein the method further comprises:

managing one or more interactions between the first non-fungible token, the second non-fungible token, and the third non-fungible token, wherein the third non-fungible token is generated by combining the first non-fungible token and the second non-fungible token.

16. The method of claim 13, wherein the method further comprises:

querying a distributed ledger to confirm existence and properties of the first non-fungible token, the second non-fungible token, and the third non-fungible token retrieving metadata associated with each non-fungible token, and comparing this metadata with any expected metadata;

querying the distributed ledger to verify ownership of the first non-fungible token, the second non-fungible token, and the third non-fungible token comprising checking a current owner address for each non-fungible token and comparing a current owner address with a claimed owner's address; and reviewing a code of a smart contract associated with first non-fungible token, the second non-fungible token, and the third non-fungible token via querying the distributed ledger to retrieve a bytecode of the smart contract and analyzing the bytecode to confirm that the smart contract operates as expected.

17. The method of claim 13, wherein the method further comprises:

overseeing the interaction between the USB flash drive and the resource machine, comprising monitoring a status, progress, and issues during build-program deployment.

18. The method of claim 13, wherein the method further comprises: coordinating operations of the first non-fungible token, the second non-fungible token, and the third non-fungible token including generation, integration, and utilization.

* * * * *